Oct. 7, 1952 R. J. KELLER 2,612,909
EXPANDER FOR BRAKES AND CLUTCHES
Filed Nov. 23, 1946
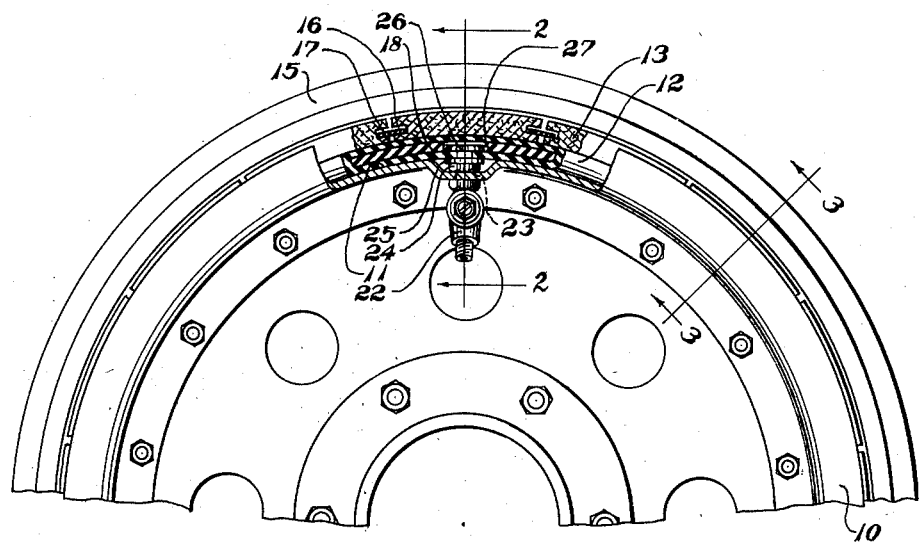
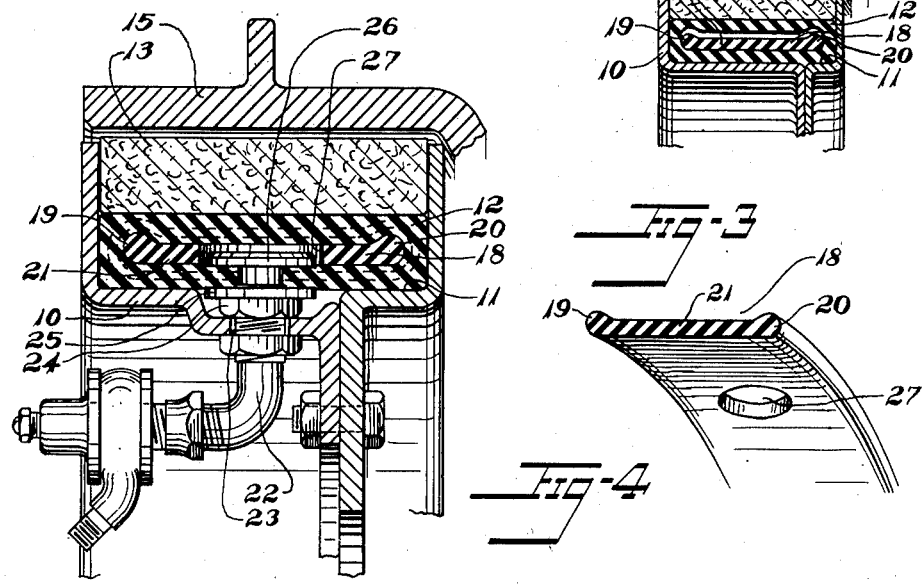
Inventor
Russell J. Keller Patented Oct. 7, 1952

2,612,909

UNITED STATES PATENT OFFICE 2,612,909

EXPANDER FOR BRAKES AND CLUTCHES

Russell J. Keller, Akron, Ohio, assignor to The B. F. Goodrich Company, New York, N. Y., a corporation of New York Application November 23, 1946, Serial No. 711,947

9 Claims. (Cl. 137—784)

This invention relates to expanders for brakes, clutches and the like and to the manufacture thereof.

It is an object of the present invention to form an endless annular expander tube with a molded inner surface.

Other objects are to provide an expander tube having walls of uniform shape along the length thereof, to provide a tube with smoothly rounded cavity margins, to provide a tube having a minimum capacity for inflation fluid in its collapsed condition, to provide for improved flexing action at the margins of the tube cavity, to provide a core-molded cavity surface, and to provide for improved retention of the tube in its supporting channel.

These and other objects will appear from the following description and the accompanying drawings.

Of the drawings,

Fig. 1 is a side elevation of an expander tube brake having a tube constructed in accordance with and embodying the invention, parts being broken away, Fig. 2 is a cross-section thereof on line 2—2 of Fig. 1.

Fig. 3 is a cross-section thereof on line 3—3 of Fig. 1, and

Fig. 4 is a perspective view of a portion of the mandrel or core.

Referring to the drawings, the numeral 10 designates a brake supporting drum formed with a channel for supporting an expander tube 12 and a set of brake shoes 13 in opposed relation to a reaction member 15. The brake shoes may be of molded material having a high coefficient of friction and heat resisting properties such as molded brake lining material. Each shoe is grooved as at 16 at its ends to engage over flat retractor springs 17 which may have their ends seated in the side walls of the brake channel for resisting torque.

The expander tube 12 has an annular core 18 in the form of a band having thickened beaded lateral margins 19, 20 separated by thinner portions 21 of uniform thickness. The core is preferably of stiff material such as hard or semi-hard rubber compound and is not adhered to the tube which surrounds it, at least in the radially outward portions. The tube 12 at its interior closely conforms to the core in shape and dimension in its deflated condition and is made of elastic resilient rubber or other rubber-like material. It has smoothly rounded lateral wall surfaces between which the outer peripheral surface is of reduced diameter. A valve stem 22 for connecting the expander tube to a source of fluid under pressure extends through an opening 23 in the floor of the channel 11 and is clamped about an opening in the tube as by a nut 24 and washer 25 at the outside face of the tube and a flange 26 at the inner face of the tube.

For clearing the flange 26 of the valve stem, an opening 27 is formed through the core 18. The arrangement is such that in the deflated position of the tube, the tube cavity is closed by contact of the tube with the core except for the clearance area about the flange 26 within the opening 27 providing a tube of minimum capacity in the deflated position shown in Fig. 2. In the inflated position shown in Fig. 3 the outer wall of the tube is separated from the core by the fluid pressure. A further advantage of this construction lies in the fact that no sharp flexure or creasing of the tube at the margins of the cavity is required to close the tube completely.

In constructing the expander tube the core 18 is molded and preferably at least partially vulcanized. The opening 27 may be formed therethrough by molding or may be formed by drilling or punching the finished core. Material is then wound about the core in sheet form and conformed to the surface of the core after which the core with the material thereabout may be vulcanized in a mold or in open steam as desired. The core acts to shape the inside of the tube to the desired shape and size in addition to serving its purposes in the completed tube.

In order to provide for high lift of the brake shoes without excessive stretch of the walls of the tube at its margins it is desirable to form the inflatable cavity with radially outwardly turned portions at the marginal walls. To provide against cracking of the tube under the stress of inflation it is also desirable to avoid sharp corners and to provide smoothly curved walls at the lateral margins of the cavity. These results are accomplished uniformly by provision of the core 18 which controls the molding of the cavity during manufacture, and thereafter acts to hold the tube in place against undesirable dislodgment, and to reduce the space for trapping inflating liquid due to displacement thereof without requiring sharp creasing of the tube wall.

Variations may be made without departing from the scope of the invention as it is defined by the following claims.

I claim:

1. An expander for applying pressure to a brake or the like, said expander comprising a normally flat annular body of rubber-like material having a circumferential fluid-receiving cavity therein, and an annular core within said cavity, said core comprising a band of stiff material having beaded lateral margins and an outer peripheral surface therebetween depressed below said margins, said body having a radially displaceable surface substantially complementary to and closely conforming to and contacting said core throughout its peripheral surface in the deflated unstrained condition of the expander and separable from said core in the radial direction by inflating pressure of the expander fluid, and means on said body for supplying fluid under pressure to said fluid-receiving cavity.

2. An expander for applying pressure to a brake or the like, said expander comprising a normally flat annular body of rubber-like material having a circumferential fluid-receiving cavity therein, and an annular core within said cavity, said core comprising a band of stiff material having a central annular zone generally flat in cross-section and annular margins extending radially outward thereof and flanking said zone, said body having a radially displaceable surface substantially complementary to and closely conforming to and contacting said core throughout its peripheral surface in the deflated unstrained condition of the expander and separable from said core in the radial direction by inflating pressure of the expander fluid, and means on said body for supplying fluid under pressure to said fluid-receiving cavity.

3. An expander for applying pressure to a brake or the like, said expander comprising a normally flat annular body of rubber-like material having a circumferential fluid-receiving cavity therein, and an annular core within said cavity, said core comprising a band of stiff material having thickened rounded margins and having a circumferential depressed area of its outer face between said margins generally flat in cross section, said body having an outer peripheral wall, a radially displaceable inner surface substantially complementary to and closely conforming to and contacting said core throughout its peripheral surface in the deflated unstrained condition of the expander and separable form said core in the radial direction by inflating pressure of the expander fluid and an outer braking face substantially flat in cross section, and means on said body for supplying fluid under pressure to said fluid-receiving cavity.

4. An expander for radially engageable brakes and clutches, said expander comprising an endless band-like expander tube of elastic material having radially inner and outer walls united at their lateral margins and defining a circumferential cavity therebetween, the outer wall thereof being expansible radially outward by fluid pressure within said cavity, a relatively stiff endless band core within said cavity separating said inner and outer walls of the expander tube by contact therewith and holding the inner wall against forces tending to move it in a radially outward direction by virtue of the stiff nature of said band core while permitting movement of the outer wall of the expander tube radially outward, and means on said tube for supplying fluid under pressure to said cavity.

5. A fluid-operated expander for applying pressure to a brake or the like comprising a resilient impervious envelope having opposed operating and back walls united at their margins and defining between them an inflation cavity having an intermediate portion and marginal portions depressed into the operating wall with respect to said intermediate portion of the cavity providing for increased displacement of said operating wall with respect to the back wall by virtue of the marginal depressed portions of the cavity, a core within said cavity separating the walls thereof by contact therewith when said cavity is deflated and having an intermediate portion and marginal portions substantially conforming to said cavity including the depressed marginal portions thereof, said operating wall being separable from said core upon inflation, and means on said envelope for supplying fluid under pressure to said cavity.

6. An expander for applying pressure to a brake or the like, said expander comprising an annular band of stiff material having beaded lateral margins, an annular expander tube of resilient rubber-like material having a cavity extending circumferentially thereof and closely conforming to the contacting said band throughout its peripheral surface in the unstrained deflated position of said tube, said tube having peripherally inner and outer walls radially displaceable one relative to the other and separated by said band, and means on said tube for supplying fluid under pressure to said cavity.

7. An expander for applying pressure to a fluid-operated brake or the like, said expander comprising an annular band of stiff material having beaded lateral margins and an outer peripheral surface therebetween depressed below said margins, and an annular expander tube of resilient rubber-like material enclosing said band, said tube having interior surfaces substantially complementary to and closely contacting said band throughout its periphery in the unstrained deflated position of said tube, including a pressure surface having depressed margins conforming to and contacting the beaded margins and depressed surface of said band, providing for extensive displacement of said surface of the tube relative to the opposite surface of the interior of the tube facilitated by said depressed margins, and means on said tube for supplying fluid under pressure to said tube.

8. An expander for applying pressure to a fluid operated brake or the like, said expander comprising an annular body of resilient rubber-like material having a circumferential fluid receiving cavity therein, an annular core within said cavity, said body having an interior surface substantially complementary to and closely contacting said core throughout its periphery in the unstrained deflated position of said body and separable from said core by the expander fluid under pressure, and means on said body for supplying fluid under pressure to said fluid-receiving cavity.

9. An expander for applying pressure to a fluid operated brake or the like, said expander comprising an annular body of rubber-like material having a circumferential fluid-receiving cavity therein forming separate pressure surfaces of said cavity displaceable one relative to the other in a radial direction, an annular core within said cavity contacting the surfaces thereof thereby to support the surfaces of said cavity in the deflated condition of the expander and separate said pressure surfaces in the radial direction, and means on said body for supplying fluid under pressure to said fluid-receiving cavity.

RUSSELL J. KELLER.

REFERENCES CITED

The following references are of record in the file of this patent:

UNITED STATES PATENTS

| Number | Name | Date |
|---|---|---|
| 858,048 | Whitman | June 25, 1907 |
| 931,563 | Carbone | Aug. 17, 1909 |
| 1,473,171 | Bowden | Nov. 6, 1923 |
| 1,559,702 | Hopkinson | Nov. 3, 1925 |
| 1,680,823 | Teed | Aug. 14, 1928 |
| 1,765,360 | Baumann | June 24, 1930 |
| 2,051,849 | Hanna | Aug. 25, 1936 |
| 2,367,776 | Hollerith | July 23, 1945 |
| 2,404,801 | Hollerith | July 30, 1946 |